(12) United States Patent
Partee

(45) Date of Patent: *Aug. 20, 2019
(10) Patent No.: US 10,387,135 B2

(54) SYSTEM AND METHOD FOR REMOTELY FLASHING A WIRELESS DEVICE

(75) Inventor: Jimmie Paul Partee, Double Oak, TX (US)

(73) Assignee: FEDEX SUPPLY CHAIN LOGISTICS & ELECTRONICS, INC., Fort Worth, TX (US)

( * ) Notice: Subject to any disclaimer, the term of this patent is extended or adjusted under 35 U.S.C. 154(b) by 547 days.

This patent is subject to a terminal disclaimer.

(21) Appl. No.: 13/587,609

(22) Filed: Aug. 16, 2012

(65) Prior Publication Data
US 2012/0317649 A1 Dec. 13, 2012

Related U.S. Application Data

(63) Continuation-in-part of application No. 12/940,411, filed on Nov. 5, 2010, now Pat. No. 9,792,104.

(51) Int. Cl.
| | |
|---|---|
| G06F 15/177 | (2006.01) |
| G06F 3/048 | (2013.01) |
| G06F 9/445 | (2018.01) |
| G06F 8/65 | (2018.01) |

(52) U.S. Cl.
CPC .................................. *G06F 8/65* (2013.01)

(58) Field of Classification Search
CPC ...................................................... G06F 21/24
USPC ....................................................... 715/735
See application file for complete search history.

(56) References Cited

U.S. PATENT DOCUMENTS

| | | | | |
|---|---|---|---|---|
| 5,974,312 | A * | 10/1999 | Hayes et al. | 455/419 |
| 6,236,593 | B1 * | 5/2001 | Hong | G11C 16/10 365/185.11 |
| 7,110,751 | B1 | 9/2006 | Overby | |
| 2002/0032023 | A1 * | 3/2002 | Lipsit | H04W 8/205 455/419 |
| 2004/0154014 | A1 | 8/2004 | Bunger | |
| 2006/0130046 | A1 * | 6/2006 | O'Neill | G06F 8/65 717/168 |
| 2006/0293081 | A1 | 12/2006 | Overby | |
| 2008/0005494 | A1 * | 1/2008 | Zimmer et al. | 711/152 |
| 2008/0160983 | A1 | 7/2008 | Poplett et al. | |
| 2010/0161397 | A1 * | 6/2010 | Gauthier | G01C 21/3605 705/14.4 |
| 2010/0169231 | A1 | 7/2010 | Bowles et al. | |

FOREIGN PATENT DOCUMENTS

| | | |
|---|---|---|
| EP | 1793573 A2 | 6/2007 |
| WO | WO 2007/035918 A2 | 3/2007 |

OTHER PUBLICATIONS

International Search Report and Written Opinion dated Feb. 21, 2012; PCT International Application No. PCT/US2011/058661.

* cited by examiner

Primary Examiner — Tadesse Hailu
Assistant Examiner — Darrin Hope
(74) Attorney, Agent, or Firm — McGuireWoods LLP

(57) ABSTRACT

A system and method for flashing an electronic device. An electronic device is received for remote flashing. The electronic device is in direct communication with a remote device. The identifying information is received for the electronic device. User instructions associated with the electronic device are displayed for flashing the electronic device. The electronic device is flashed in response to the identifying information.

17 Claims, 6 Drawing Sheets

SYSTEM AND METHOD FOR REMOTELY FLASHING A WIRELESS DEVICE

CROSS-REFERENCE TO RELATED APPLICATIONS

This patent application is a Continuation-in-Part of U.S. patent application Ser. No. 12/940,411 entitled SYSTEM AND METHOD FOR FLASHING A WIRELESS DEVICE which is a co-pending application of U.S. patent application Ser. Nos. 12/940,331 and 12/940,346, entitled "SYSTEM AND METHOD FOR REMOVING CUSTOMER PERSONAL INFORMATION FROM AN ELECTRONIC DEVICE" and "SYSTEM AND METHOD FOR AUDITING REMOVAL OF CUSTOMER PERSONAL INFORMATION ON ELECTRONIC DEVICES", both filed on Nov. 5, 2010 now U.S. Pat. No. 9,792,104. The teachings and disclosures of which are hereby incorporated in their entireties by reference thereto.

BACKGROUND

Usage of mobile, wireless, and electronic devices has grown nearly exponentially in recent years. The expanded use of such products and devices has been fostered by improvements in communications standards, protocols, signaling, hardware, software, and other advances. Under various circumstances, users may return electronic devices to an original equipment manufacturer (OEM), retailer, repair facility, service provider or other entity. Electronic devices are often returned for repairs, exchanges, warranty issues, or any number of other justified or arbitrary reasons. It is imperative that any electronic device that has been returned be cleared of all personal information, sensitive data, or other information linked to a previous user. If the personal information is not removed, applicable laws, industry standards, and common business practices may be violated. For example, the personal information may be used by another party to perpetrate an act of identity theft. Similarly, a previous user's privacy may be otherwise violated.

SUMMARY

One embodiment provides a system, method and remote device for flashing an electronic device. An electronic device may be received for remote flashing. The electronic device may be in direct communication with a remote device. The identifying information may be received for the electronic device. User instructions associated with the electronic device may be displayed for flashing the electronic device. The electronic device may be flashed in response to the identifying information. The method may also be implemented by a remote device including a processor and memory executing a set of instructions, logic, or a flashing application.

Another embodiment provides a system for flashing electronic devices. The system may include a remote flashing device. The system may also include a managing device for managing an application utilized by the remote flashing device to flash one or more electronic devices. The remote flashing device may be operable to receive an electronic device for remote flashing, wherein the electronic device is in direct communication with the remote device, receive identifying information for the electronic device, display user instructions associated with the electronic device for flashing the electronic device, and flash the electronic device in response to the identifying information.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
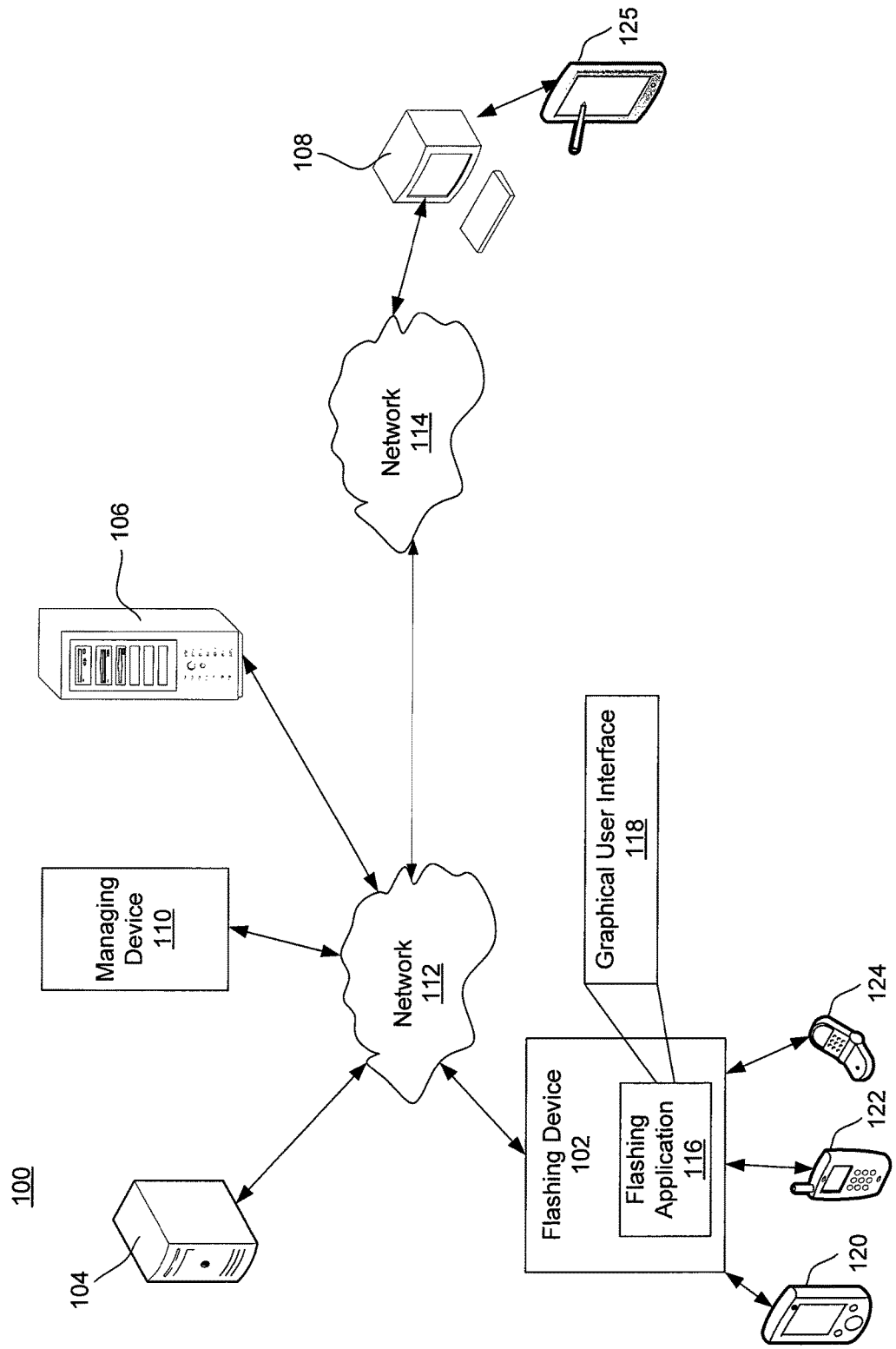
FIG. 1 is a pictorial representation of a flashing system in accordance with an illustrative embodiment.

The illustrative embodiments provide a system and method for detecting and removing customer private information (CPI) from electronic devices. CPI is removed from electronic devices in order to ensure the electronic devices may be repaired, exchanged, refurbished, returned, substituted, or otherwise recycled for usage. The detection of and removal of CPI allows service providers and other organizations or parties to comply with applicable laws, meeting industry standards, and maintain good relationships with consumers, retailers, service providers, and others that may utilize the electronic device or provider services for those electronic devices.

The illustrative embodiments may be implemented as a local client, networked system, or device for flashing electronic devices. Flashing electronic devices includes removing all personal information previously entered or utilized by a previous owner or user as well as ensuring the electronic device has the most updated versions of software, firmware, or other required or designated applications for utilizing the electronic device. The illustrative embodiments may allow multiple electronic devices, such as cell phones to be connected to a single flashing device (also referred to as a testing device or client) for flashing multiple electronic devices.

In one embodiment, electronic devices may be flashed remotely. For example, the electronic device may be connected to a computer that is configured to communicate with one or more networks. In one embodiment, the flashing process may be performed based on instructions or commands received from a user directly accessing the computer. For example, the user may access a local or network application to perform the flashing process. In another embodiment, the flashing process may be performed based on remotely received instructions or commands, such as input from a communications service provider, technician, operator, or automated system that communicates with the computer and applicable electronic device through a communications network, program, website, operating system, or other interface.

Electronic devices may include computing and telecommunications devices including cell phones, PDAs, tablets, smart phones, laptops, e-readers, mp3 players, and other forms of personal or consumer electronic devices. CPI may include information, such as phone numbers, addresses, email addresses, IP addresses, social security numbers, bank accounts, contact lists, address books, passwords, usernames, and other sensitive information associated with the user or utilized by the user. Due to the prolific usage of wireless device, the process of flashing a wireless device is utilized as an ongoing example even though the process may be utilized for any number of electronic devices.

The process of flashing one or more electronic devices may take anywhere from a matter of seconds to a number of minutes. As a result, the technician or operator, herein referred to as a user, may initiate flashing for each of the electronic devices individually, as a group, or for an entire group which may represent electronic devices from multiple original equipment manufacturers (OEMs) or multiple devices of a single or different OEM's electronic device(s) at different times, concurrently or simultaneously, based on the preferences of the user. The process may be also be performed across networks remotely as is needed. For example, a customer service representative of a communications service provider may utilize a web program/remote access program and a first computing device to interface with a second computing device communicating (physically or wirelessly) with an electronic device to be processed.

The inability to properly remove CPI may result in identity theft, consumer bad will, contract or legal violations, and other undesirable effects or outcomes. In various embodiments, the CPI removal and detection process may be utilized or integrated into warehouse management operations, logistics services, and systems and devices that are utilized to process electronic devices. The electronic devices are processed by determining or detecting whether CPI is present on the electronic device, removing the CPI if necessary and reporting the removal or non-removal of CPI on devices that are being processed or have previously been processed to provide an audit trail as well as trend analysis information to interested parties. The embodiments as herein described may be automated or may require user interaction. In particular, the illustrative embodiments provide a system and method for tracking CPI that is detected on processed or unprocessed electronic devices and implementing CPI removal as well as tracking. The illustrative embodiments may be utilized to check for or check and clear CPI from electronic devices (also referred to as detect or detect and delete).

In one embodiment, the flashing device may include multiple partitions for implementing flashing for the electronic devices. A flashing application may be implemented or executed by the flashing device to flash the electronic devices by removing customer personal information (CPI) and updating the electronic device to include the most recent update or returning the electronic device back to a factory standard configuration. Updates or configurations of the electronic device are defined to include operating systems, firmware, applications and other software required to operate the electronic device, FIG. 1 is a pictorial representation of a flashing system in accordance with an illustrative embodiment. FIG. 1 provides an embodiment of a flashing system 100. The flashing system is an electronic environment or networked system for individual devices that individually or together may be utilized to perform flashing for a number of electronic devices, such as various wireless devices.

In one embodiment the flashing system 100 may include flashing devices 102, 104, 106 and 108, a managing device 110 and networks 112 and 114. The flashing device 102 may further include the flashing application 116 displaying a graphical user interface 118 and may be utilized to test wireless devices 120, 122 and 124. As shown, the networks 112 and 114 represent public or private data or communication networks.

In one embodiment, network 112 may represent a private network utilized by a service provider to test numerous wireless devices returned to the service provider for repair, refurbishment, replacement, or for other circumstances. For example, the network 114 may represent an open or public network, such as the internet that is accessed by millions of users daily. The networks 112 and 114 may represent any number of private, virtual, or public networks. The networks 112 and 114 may also represent networks operated by one or more communications service providers that may provide electronic devices utilized by various users and that may have legal or business requirements to ensure that the initial content on the wireless devices 120-124 is managed.

The flashing devices 102, 104, 106 and 108 (102-108) represent computing or communication devices each of which may be utilized to flash a number of wireless devices. Each of the flashing devices 102-108 may execute a version of the flashing application 116 in order to flash wireless devices, such as wireless devices 120, 122 and 124. Alternatively, the flashing devices 102-108 may access a flashing application stored and executed by the managing device 110 through the network 112. The managing device 110 is a computing device configured to manage the flashing systems, operations, applications and updates utilized by the flashing devices 102-108. In one embodiment, the managing device 110 may itself be a flashing device.

In one embodiment, the managing device 110 communicates with a network web portal during the initialization phase of the flashing system 100 or at a designated timeframe during off service hours to update the flashing application 116 or data including all applicable new software packages, utilized by the flashing applications 116 to flash the wireless devices 120, 122 and 124. The managing device 110 may control the flow of network information pertaining to updates so as to prevent the user from applying a flash request to an OEM or device which is in the process of updating. For example, during updates a visual blinking red light may indicate "Updates are in Progress . . . . Please wait" with the OEM selection process being locked out until update are completed and a status indicator light goes green to indicate the flashing device 102 is "ready."

The managing device 110 may also receive or archive information and data regarding the flashing of wireless devices, such as wireless devices 120-124 performed by each of the flashing devices 102-108. As a result, the flashing activities of the service provider may be monitored, tracked, or archived for subsequent reference.

In one embodiment, the flashing system 100 may be utilized in a single building or complex of the service provider for flashing wireless devices. The flashing device 108 may represent a device at a remote location, home, or facility, such as an annex building or retail store, that is also utilized for flashing wireless devices, such as wireless device 125 (similar to wireless devices 120-124 and the described processes are equally applicable to wireless device 125). The flashing device 108 may also represent a home or personal computer or communications device of a user/customer that desires to clear, clean, or reset the wireless device 125. The flashing device 108 may include a version of the flashing application for communicating with the managing device 110 to flash the wireless device 125, update provided or default content, and clear CPI. The flashing application 116, as well as the graphical user interface 118, may allow a user to flash the wireless devices 120, 122, 124, and 125. The flashing application 116 may also be executed by a standard computing or communications device to perform flashing by utilizing a number of adapters or hubs for connection to multiple wireless devices.

In one embodiment, the flashing application 116 may be executed on separate partitions of the flashing device 102 simultaneously in order to concurrently or simultaneously test the wireless devices 120, 122 and 124. The processes used by the flashing application 116 may not be compatible (inducing conflicts or errors) for all OEMs or wireless devices models requiring that separate instances of the flashing application 116 be executed so that user time and effort to flash the wireless devices 120-124, as well as computing resources are minimized.

In one embodiment, the partitioning is necessary to implement instances of the flashing application 116 (or separate flashing applications customized for specific OEMs or models) on separate partitions that would otherwise experience memory conflicts or errors if the flashing applications were running on the same partition. For example, wireless devices 120 and 124 might not be able to be tested concurrently because of conflicts within the flashing application 116. As a result, separate instances of the flashing application 116 may be executed on a first partition for flashing the wireless devices 120 and 122 that do not have conflicts and a separate instance of the flashing application 116 may be executed on a second partition for flashing the wireless device 124. As a result, the wireless devices 120-125 may be flashed concurrently, sequentially, or simultaneously despite potential conflicts or errors.

Figure 2:
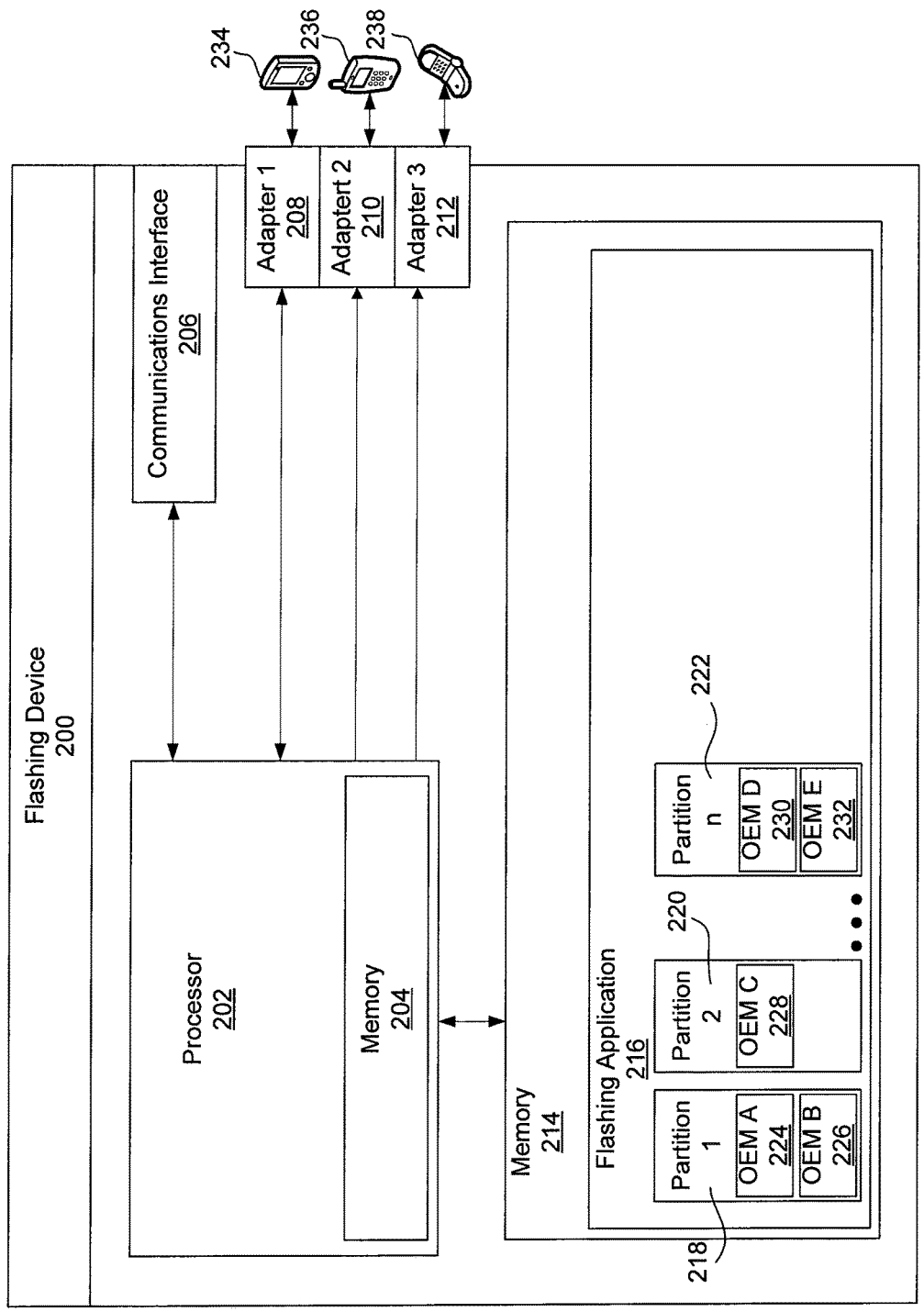
FIG. 2 is a block diagram of a flashing device in accordance with an illustrative embodiment.

FIG. 2 is a block diagram of a flashing device in accordance with an illustrative embodiment. FIG. 2 illustrates an embodiment of a flashing device 200. The flashing device 200 may be a particular implementation of the flashing devices 102-108 or the managing device 110 of FIG. 1. The flashing device 200 may include any number of computing and communications element including hardware, software, and peripherals that are not specifically shown, such as circuits, motherboards, adapters, displays, circuits, logic, and other similar elements.

In one embodiment, the flashing device 200 may include a processor 202, a memory 204, a communications interface 206, adapter 1 208, adapter 2 210, adapter 3 212, a memory 214, an application 216, partition 1 218, partition 2 220 and partition n 222. The respective partitions 218-222 may include OEM A 224, OEM B 226, OEM C 228, OEM D 230 and OEM E 232. The communications interface 206 is an interface for communicating with one or more networks or devices.

The processor 202 is circuitry or logic enabled to control execution of a set of instructions. The processor 202 may be microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor 202 may be a single chip or integrated with other computing or communications elements.

The memories 204 and 214 are hardware elements, devices, or recording medias configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums.

In one embodiment, the communications interface 206 is an Ethernet network interface for communicating through an Ethernet network. The communications interface 206 may also represent other forms of network adapters for communicating with or through traditional or proprietary networks (e.g. DSL, cable, fiber optic, WiFi, WiMAX, etc).

The adapters 208-212 represent adapters for communicating with a number of different wireless device types. For example, the adapters 208-212 may include mini or micro USB adapters or other similar adapters for communicating with wireless devices 234, 236 and 238. The adapters 208-212 are representative of interfaces that may communicate with wireless devices of all makes and models. Adapters 208-212 are shown as illustrative embodiments only. In one embodiment, the flashing device 200 includes enough adapters to fully occupy the time of the user in connecting and testing a number of wireless devices concurrently. For example, a user may connect the wireless devices 234 and 236 to adapter 1 208, and adapter 2 210, respectively, in order to initiate and complete the flashing process. The adapters 208-212 may also represent one or more wireless adapters for communicating with the wireless devices 234, 236, and 238. The wireless adapters may utilize any number of short-range or long-range wireless standards or protocols, such as Bluetooth, WiFi, WiMax, or so forth.

Once the flashing process has been initiated, the user may connect the wireless device 238 to the adapter 212 to begin testing for the wireless device 238. The flashing device 200 may also be connected to a number of other wireless devices thereby efficiently employing the user's time as well as the resources of the flashing device 200. The memory 214 may be configured to store data and information utilized by the flashing application 216 to perform the flashing as well as the result from the flashing and the flashing application 216 itself. The flashing application 216 may be configured to automatically flash the wireless devices 234-238 or to implement the flashing based on user input.

In one embodiment, once the wireless devices 234-238 are connected to or in communication with the respective adapters 208-212, the application 216 may recognize the wireless devices 234-238 and implement the designated flashing process which may include removal of all CPI, restoring default content (e.g. images, files, settings, etc) and reinstalling the updates corresponding to the wireless device.

In another embodiment, the application 216 may allow a user to specify an OEM model and other details associated with each of the wireless devices 234-238 so that the application 216 may guide the user through a complete flashing of the wireless devices 234-238. As a result, the partitions including partition 1 218, partition 2 220, and partition n 222 may execute separate instances of the application 216 to test the wireless devices 234-238. For example, partition 1 may execute an application for OEM A 224 and OEM B 226 because of their flashing compatibilities.

The application 216 may be separately implemented on partition 2 220 for OEM C 228 based on a conflict OEM C 228 (or associated devices) may have with OEM B 226 and OEM D 230 (and their associated devices). Similarly, partition n 222 may execute an application for OEM D 230 and OEM E 232 to test specific wireless devices. Although not specifically shown herein, the flashing device 200 includes any number of partitions that allows for testing numerous wireless devices representing different OEMs and models. Partition 1 218, partition 2 220, and partition n 222, may represent partitions of the memory 214 that are divided into logical drives associated with data and application storage.

In one embodiment, the memory 214 may include a primary partition and may be further divided into other secondary logical drives and partitions that may be assigned names, letters, and identifiers for storing and accessing the related flashing applications.

Figure 3:
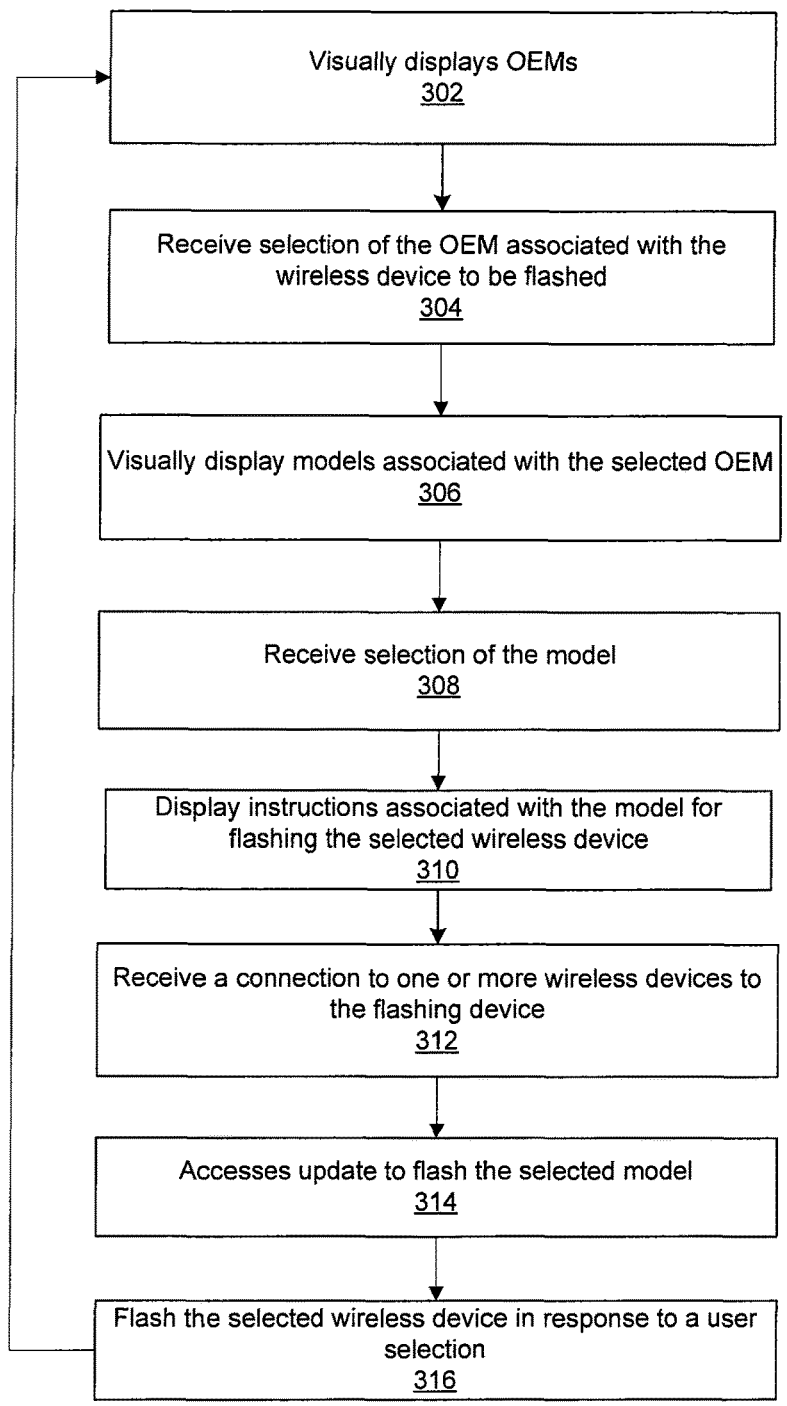
FIG. 3 is a flowchart of a process for flashing an electronic device in accordance with an illustrative embodiment.

FIG. 3 is a flowchart of a process for flashing an electronic device in accordance with an illustrative embodiment. The process of FIG. 3 may be implemented by one or more flashing devices in accordance with an illustrative embodiment. The process of FIG. 3 may be implemented simultaneously, sequentially, or concurrently for numerous different wireless devices. For example, the process may be initiated for a first wireless device and then once the flashing process begins which may take five minutes the user may turn his or her attention to another wireless device and utilize the flashing device to begin flashing a second wireless device. Alternatively, the process may be initiated manually or simultaneously for multiple wireless devices.

As previously noted, the process may be performed for electronic devices in a location of the user or remotely located from the user. In one embodiment, the process of FIG. 3 is performed by an operator based on a request from a customer through an application or website. The user may grant the operator authority to implement a program and manage the processes performed on the wireless device.

The process of FIG. 3 begins by user interface of the flashing system visually displaying OEMs (step 302). The OEMs of step 302 may be OEMs with which a particular service provider, company, or group works with or utilizes. For example, the flashing device may display the OEMs available based on previous selections. For example, the OEM most frequently associated with wireless devices being flashed may be displayed first with other OEMs similarly being displayed based on previous selections. In another embodiment, the OEMs may be displayed utilizing alphabetical order or other formats selected by a user.

Next, the flashing device receives selections of the OEM associated with the wireless device to be flashed (step 304). The selections or user input provider during the process of FIG. 3 may be received through a touch screen, mouse selection, voice input or through any number of other communications signals or interactions with the flashing device as are known in the art.

Next, the flashing device visually displays models associated with the selected OEM (step 306). The information displayed during the process of FIG. 3 may be displayed utilizing libraries, databases, files, links or other elements for properly linking to the correct information and displaying to the user. The information may be stored locally or accessed from servers, database, or networks that manage the information. For example, the flashing system may be a personal computer of a user that is connected to a refurbished iPhone. The flashing system may connect to a database of an OEM or communications service provider, such as Apple or AT&T to retrieve the applicable information, instructions, programs, standards, scripts, commands, default content, updates, golden image, requirements, or other data.

The flashing device receives selection of the model (step 308). Next, the flashing device displays instructions associated with the model for flashing the selected wireless device (step 310). In some cases, the steps required to remove all personal information, completely clear the memory, or perform updates for the wireless device may be complicated or may differ across OEMs or models. As a result, the instructions are particularly useful for the user in order to efficiently step through the process for flashing the wireless device for a number of devices. The instructions may be displayed textually and audibly for facilitating the user's progression to flashing the wireless device.

Next, the flashing device receives a connection to one or more wireless devices to the flashing device (step 312). In one embodiment, the user may connect an adapter such as a micro USB adapter to the micro USB port of the wireless device. The wireless device may also require that it be powered on or placed in a configuration mode in order to communicate with the flashing device. The flashing device may provide an index, help, or instructions for guiding the users. As previously noted, the connection or communications may also be wireless.

Next, the flashing device accesses updates to flash the selected model (step 314). The updates may include applications, operating systems, versions, firmware, default content, and other elements for ensuring the wireless device has the most up-to-date operating software, content, and instructions provided by the OEM service provider or other group with which the wireless device is associated. In one embodiment, the updates may have previously been downloaded to the flashing device and associated with the application. In another embodiment, the updates may be downloaded from a network resource or alternative or secondary resource in order to further proceed with flashing of the wireless device.

Next, the flashing device flashes the selected wireless device in response to a user selection (step 316). In one embodiment, all memory locations of the wireless device associated with CPI may be cleared and any applicable fields, text or memory may be deleted, written over or otherwise cleared. Similarly, the wireless device may have the operating system, most recent applications, or other updates installed or reinstalled on the wireless device. In some cases, reinstallation of the operating system and other updates may supersede clearing of CPI information as the CPI information is automatically deleted or written over during the reinstallation process.

The process of FIG. 3 may then be implemented for another wireless device beginning with visually displaying OEMs (step 302) to receive the applicable selection. Alternatively, for identical wireless device the flashing device may receive a connection of one or more wireless devices to the flash device (step 312) based on an operator action with the process proceeding as described herein.

Figure 4:
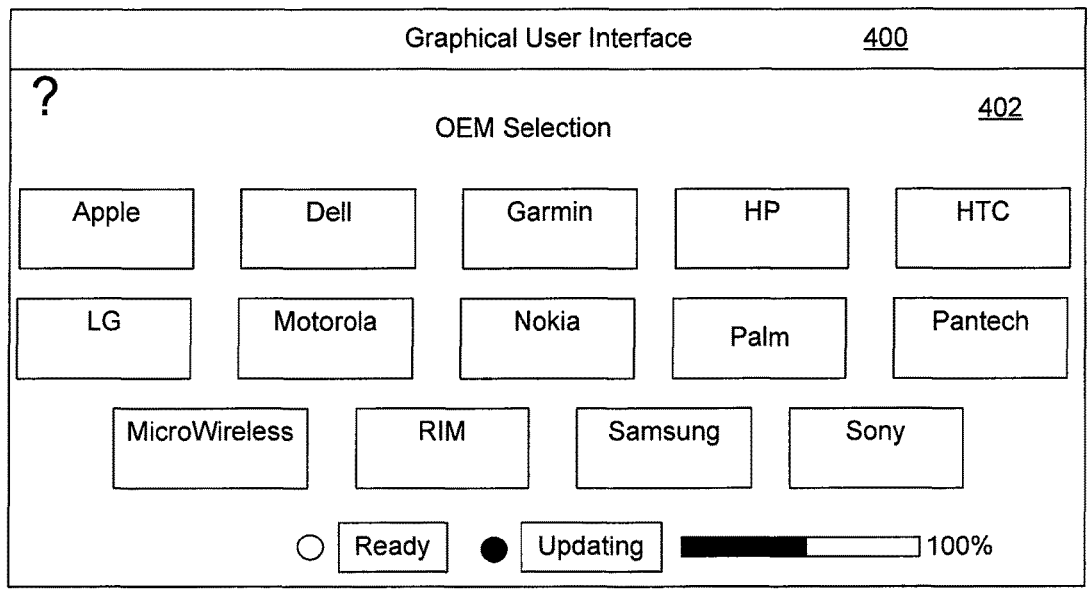
FIG. 4 is a pictorial representation of a graphical user interface for selecting an OEM in accordance with an illustrative embodiment.

FIG. 4 is a pictorial representation of a graphical user interface for selecting an OEM in accordance with an illustrative embodiment. The graphical user interface 400 displays a window or user interface for an OEM selection 402. The OEM selection 402 may allow a user to select any number of OEMs associated with the wireless device to be tested. Examples of OEMs may include Apple, Del, Garmin, HP, HTC, LG, Motorola, Ericcson, Nokia, Palm, Pantech, Micro Wireless, RIM, Samsung and Sony.

In one embodiment, new OEMS may be added based on manual inputs or based on a search for other OEMs that are not displayed in the OEM selection 402. Interactions with the graphical user interface 400 may be implemented through a mouse, keyboard, touch screen, the wireless device itself, verbal commands or other forms of communication or signal with the flashing device. The OEM selection 402 may indicate whether the OEM information is ready or is being updated and the progress of any ongoing updates. Any of the graphical user interfaces of FIGS. 4-7 may display a help icon for providing the user additional information about the OEM, model, or flashing process at any time.

Figure 5:
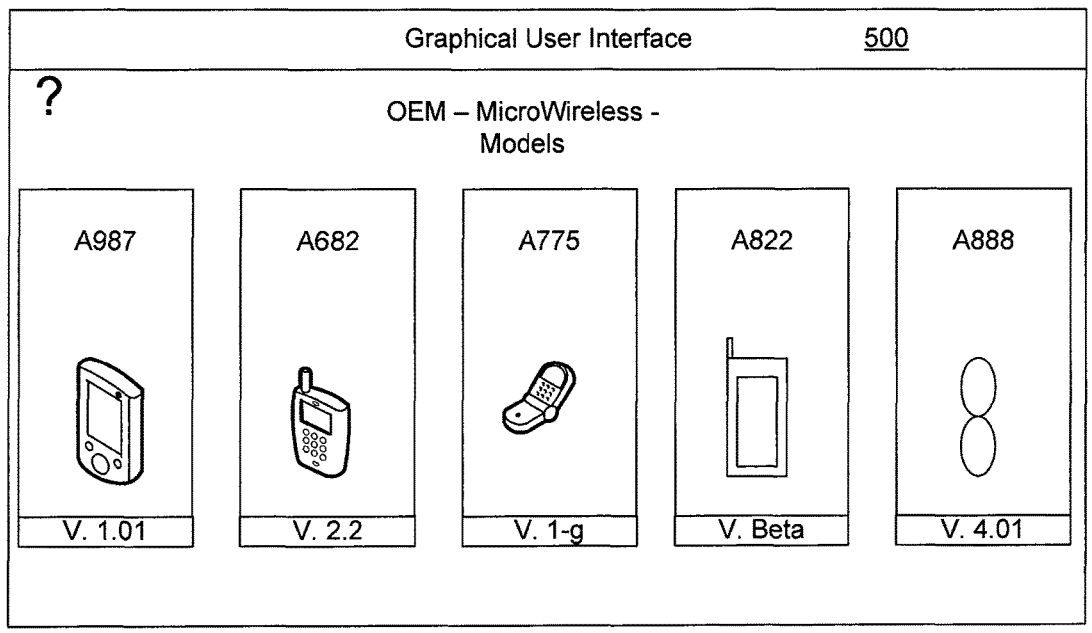
FIG. 5 is a pictorial representation of a graphical user interface for selecting a particular electronic device model in accordance with an illustrative embodiment.

FIG. 5 is a pictorial representation of a graphical user interface for selecting a particular electronic device model in accordance with an illustrative embodiment. The graphical user interface 500 may display a number of models associated with the selected OEM. For example, the graphical user interface 500 may display all of the applicable models associated with the OEM, "MicroWireless." The models may include a number designator, identification, picture, search window, or other information utilized to select the applicable model.

Figure 6:
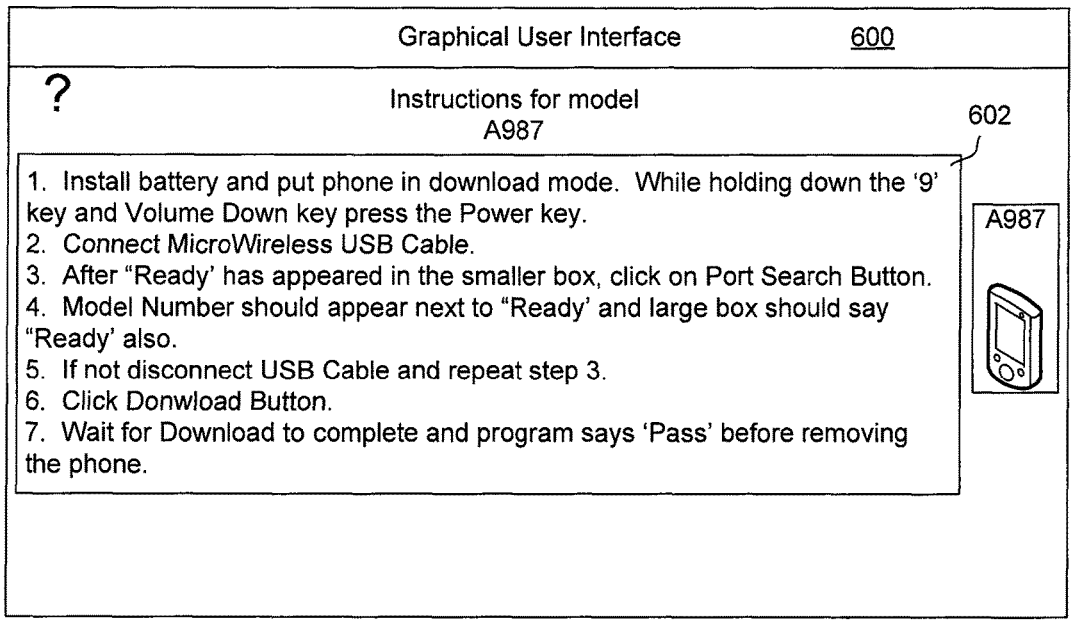
FIG. 6 is a pictorial representation of a graphical user interface for providing instructions to a user flashing an electronic device in accordance with an illustrative embodiment.

FIG. 6 is a pictorial representation of a graphical user interface for providing instructions to a user flashing an electronic device in accordance with an illustrative embodiment. The graphical user interface 600 provides an interface for displaying instructions for the selected model. For example, if the user has selected MicroWireless as the OEM and the A987 model the graphical user interface may display instructions 602. The instructions may provide details for ensuring that the wireless device is properly flashed.

In one embodiment, the graphical user interface 600 may include a button 604 or selection element for posting questions, requesting instruction clarifications, or otherwise providing dynamic feedback for improving the flashing application. For example, the user may add suggestions, remove redundant steps or otherwise configure the instructions 602 for preciseness or to be more efficient. In one embodiment, the editing features or adding features of FIGS. 4-7 may only be available to an administrator or other user authorized to reconfigure the graphical user interface 600 of the flashing application in a programming or update mode.

Figure 7:
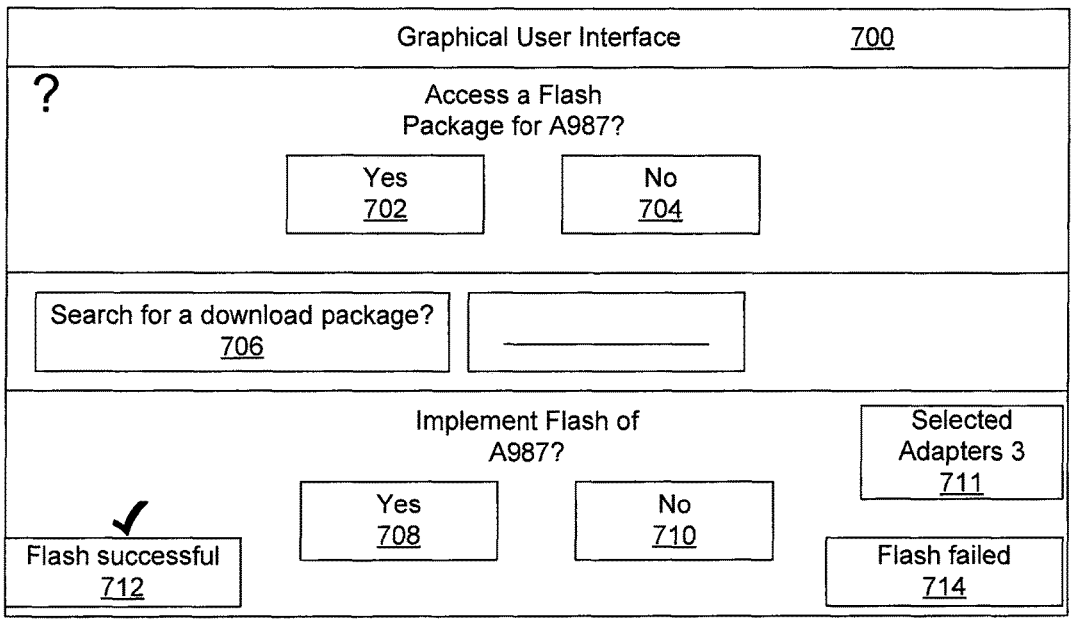
FIG. 7 is a pictorial representation of a graphical user interface for implementing flashing of an electronic device in accordance with an illustrative embodiment.

FIG. 7 is a pictorial representation of a graphical user interface for implementing flashing of an electronic device in accordance with an illustrative embodiment. The graphical user interface 700 may include selection elements 702 and 704 for selecting whether to access a flash package for the selected model. For example, selection of the selection element 702 may begin a script program or instructions that communicate updates to the wireless device. Selection of the selection element 702 may also retrieve the applicable information utilized to flash the selected wireless device. If the appropriate flash package including updates, instructions or other information is unavailable, a selection element 706 may be displayed to the user for searching for a download package.

Once the user has all of the necessary information the user may be displayed selection elements 708 and 710 for selecting whether to implement a flash for the selected wireless device. At any time during the display of the graphical user interface 700, the user may be allowed to select one or more adapters for which the process is implemented. For example, the user may utilize selection element 711 to select one or more adapters associated with the selected wireless device. As a result, the flashing process is performed for the specified adapters.

In another embodiment, the user may have connected a number of identical models to the flashing device to be flashed. As a result, the process may be implemented simultaneously, sequentially, or concurrently (representing different initiation times) for each of those identical models as selected by the user utilizing a selection element such as selection element 711 that allows the user to specify the wireless devices and the adapters associated with each of those devices.

Indicators 712 and 714 may indicate whether the flash was successful or whether it failed. Other indicators may also allow the user to specify whether to archive or save tests associated with the flashing process. For example, the service provider may want to document a memory map of the wireless device showing that it has been properly flashed and that no CPI is available on the wireless device as shown by memory mapping, tests, or other data that verify the flashing process has occurred and has occurred correctly.

In one embodiment, the flashing application may be updated at any time. For example, the flashing application may be implemented utilizing a cloud network or other distributed architecture. Updates may be distributed to any number of flashing systems or devices. Communications service providers, OEMs, and other parties may update the libraries utilized to perform the flashing process at any time.

Figure 8:
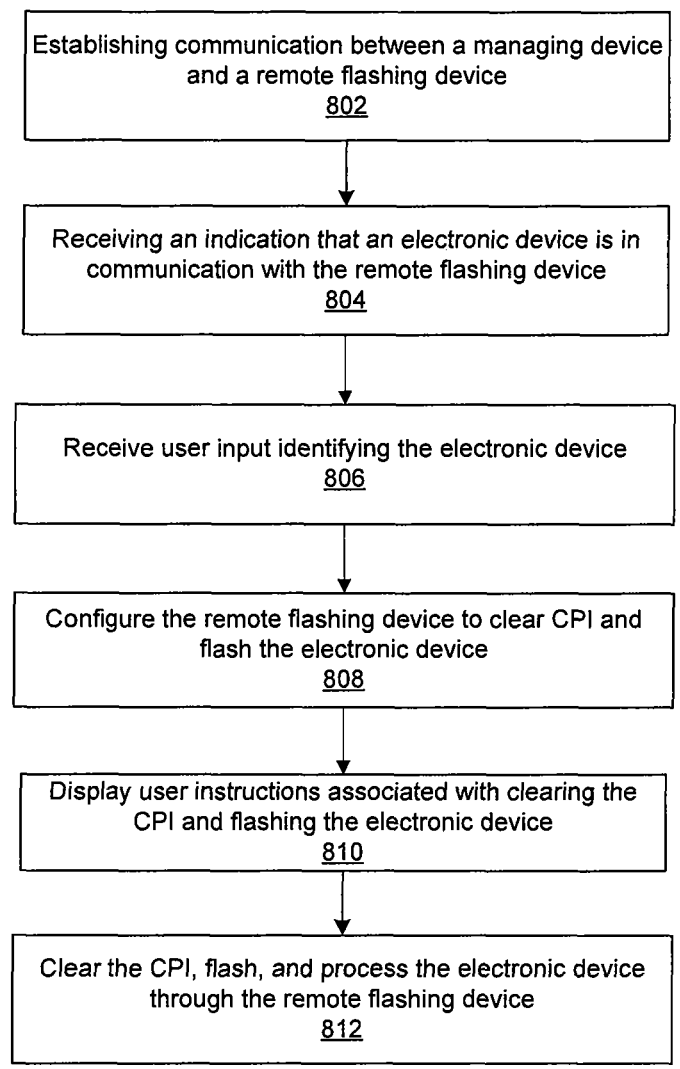
FIG. 8 is a flowchart of a process for remotely clearing an electronic device in accordance with an illustrative embodiment.

FIG. 8 is a flowchart of a process for remotely clearing an electronic device in accordance with an illustrative embodiment. In one embodiment, the process of FIG. 8 may be implemented by one or more devices or systems communication through one or more networks referred to herein as the "system". For example, a managing device may represent a server operated by a communications service provider and a remote flashing device may represent a personal computer in communication with an electronic device that is being flashed or cleared of CPI. The server and client may communicate utilizing a web interface, application(s), instructions, or other logic. An application or logic implemented by either the managing device or the remote flashing device may display a user interface for communicating information, data, images, and instructions to the user as well as receiving user input.

The process may begin by establishing communication between a managing device and a remote flashing device (step 802). The communications may represent a standard network or packet communications. The communications may also be a dedicated connection between the devices or systems. In one embodiment, the user may access a website associated with the managing device to establish the connection, such as the website of a communications service provider to clear a recently purchased and pre-owned device. In another embodiment, the communication may represent communications between one or more applications on the managing device and the remote flashing device.

Next, the system receives an indication that an electronic device is in communication with the remote flashing device (step 804). The indication may indicate the presence or connection to the electronic device for performing the CPI removal or flashing process. For example, the remote flashing device may indicate to the managing device that the electronic device is connected to the remote flashing device by a hardwire or wireless connection.

Next the system receives user input identifying the electronic device (step 806). The user may identify or verify a make and model or other relevant information for the electronic device. In one embodiment, the system automatically detects identifying information for the electronic device and presented to the user for confirmation through the user interface. As previously described, the user interface may display windows or images for confirming or receiving information received from the user.

Next, the system configures the remote flashing device to clear CPI and flash the electronic device (step 808). In one embodiment, the managing device may communicate a script or instructions to the flashing device in discrete messages (queued) or in real-time. For example, the managing device may communicate a program and libraries for performing the flash, CPI clear and verification process, and update of software and default content.

Next, the system displays user instructions associated with clearing the CPI and flashing the electronic device (step 810). In one embodiment, the instructions may include steps that may be required to be user implemented or implemented directly on the electronic device rather than through the remote flashing device. In another embodiment, user instructions may not be required and instead the process may be performed automatically by the system based on analysis or determinations made for the electronic device.

Next, the system clears the CPI, flashes, and otherwise processes the electronic device (step 812). The system may also perform verification of step 812 as may be necessary or according to government or business standards. The process may be performed remotely for any number of wireless devices at a single remote flashing device or at multiple remote flashing devices.

The previous detailed description is of a small number of embodiments for implementing the invention and is not intended to be limiting in scope. The following claims set forth a number of the embodiments of the invention disclosed with greater particularity.

What is claimed:

1. A method for remotely flashing an electronic device, the method comprising:
   establishing, over a communication network, communication between a flashing device and a managing device;
   establishing communication between the flashing device and a plurality of electronic devices;
   receiving, at the flashing device, identifying information for the plurality of electronic devices for performing remote flashing of the electronic device;
   based on the identifying information of the plurality of electronic devices, receiving in real-time, by the flashing device, instructions from the managing device for performing the remote flashing of the plurality of electronic devices;
   executing, by the flashing device, the instructions received from the managing device for performing the remote flashing of the plurality of electronic devices concurrently, wherein executing the instructions received from the managing device comprises flashing using a separate flashing application, executed on separate partitions of the flashing device, for each of the plurality of electronic devices, wherein the separate flashing application is customized based on the identifying information associated with each of the plurality of electronic devices, wherein flashing the plurality of electronic devices further comprises:
      clearing memories and customer private information from the plurality of electronic devices;
      restoring default content; wherein the restoring comprises reinstalling the default content or an updated version of the default content on the electronic device;
      updating the firmware of the electronic device; and
      updating the software of the electronic device;
      verifying the flashing process has occurred by memory mapping; and
      saving a memory map verifying the flashing process has occurred and that no customer private information is available on the electronic device.

2. The method according to claim 1, further comprising displaying, on the plurality of electronic devices, user instructions for flashing the plurality of electronic devices.

3. The method according to claim 1, wherein the communication between the flashing device and the plurality of electronic devices is a wireline communication.

4. The method according to claim 1, wherein receiving the identifying information includes:
   receiving a selection of a make and model associated with the plurality of electronic devices.

5. The method according to claim 1, wherein the plurality of electronic devices are identified automatically and, wherein user input verifies the identification.

6. The method according to claim 1, wherein the communication between the flashing device and the plurality of electronic devices is a wireless communication.

7. The method according to claim 1, further comprising:
   displaying one or more images confirming the identifying information.

8. The method according to claim 1, wherein the flashing further comprises:
   downloading updates on the flashing device; and
   installing the updates on the plurality of electronic devices, wherein the updates include updated firmware, software versions, and default content.

9. A system for flashing electronic devices, the system comprising:
   a remote flashing device;
   a managing device for managing a flashing application utilized by the remote flashing device to flash a plurality of electronic devices, the remote flashing device is operable to:
      establish, over a communication network, communication between the remote flashing device and the managing device;
      establish communication between the remote flashing device and the plurality of electronic devices for remote flashing, wherein the plurality of electronic devices are in direct communication with the remote flashing device that is configured to utilize the managing device for remotely flashing;
      receive, at the remote flashing device, identifying information for the plurality of electronic devices;
      based on the identifying information of the plurality of electronic devices, receive in real-time, by the remote flashing device, instructions from the managing device for performing the remote flashing of the plurality of electronic devices; and
      executing, by the remote flashing device, the instructions received from the managing device for performing the remote flashing of the plurality of electronic devices concurrently, wherein executing the instructions received from the managing device comprises flashing using a separate flashing application, executed on separate partitions of the remote flashing device, for each of the plurality of electronic devices, wherein the separate flashing application is customized based on the identifying information associated with the plurality of electronic devices, wherein flashing the plurality of electronic devices further comprises:
  clearing memories and customer private information from the plurality of electronic devices;
  restoring default content; wherein the restoring comprises reinstalling the default content or an updated version of the default content on the electronic device;
  updating the firmware of the electronic device; and updating the software of the electronic device;
  verifying the flashing process has occurred by memory mapping; and
  saving a memory map verifying the flashing process has occurred and that no customer private information is available on the electronic device.

10. The system according to claim 9, wherein the managing device is configured to manage a plurality of remote flashing devices operating at the same time.

11. The system according to claim 9, wherein the remote flashing device is a personal computing or communications device.

12. The system according to claim 9, wherein the managing device is a server.

13. A flashing device for testing electronic devices comprising:
  a processor for executing one or more flashing applications; and
  a memory configured to store the one or more flashing applications, wherein the one or more flashing applications are operable to:
    receive a plurality of electronic devices for remote flashing, wherein the plurality of electronic devices are in direct communication with the flashing device that is configured to utilize a managing device for remotely flashing;
    receive, at the flashing device, identifying information for the plurality of electronic devices;
    based on the identifying information of the plurality of electronic devices, receive, by the flashing device in real-time, instructions from the managing device for performing the remote flashing of the plurality of electronic devices; and
    execute, by the flashing device, the instructions received from the managing device for performing the remote flashing of the plurality of electronic devices concurrently, wherein executing the instructions received from the managing device comprises flashing using a separate instance of the flashing application of the one or more flashing applications, executed on separate partitions of the flashing device, for each of the plurality of electronic devices, wherein flashing the plurality of electronic devices further comprises:
      clearing memories and customer private information from the plurality of electronic devices;
      restoring default content; wherein the restoring comprises reinstalling the default content or an updated version of the default content on the electronic device;
      updating the firmware of the electronic device; and
      updating the software of the electronic device;
    verify the flashing process has occurred by memory mapping; and
    save a memory map verifying the flashing process has occurred and that no customer private information is available on the electronic device.

14. The flashing device according to claim 13, wherein the one or more flashing applications are configured to flash any of the plurality of electronic devices from a plurality of OEMs.

15. The flashing device according to claim 13, wherein the one or more flashing applications include a user interface for receiving the identifying information and providing user instructions for flashing the plurality of electronic devices.

16. The flashing device according to claim 13, wherein the identifying information includes at least a manufacturer and model associated with the plurality of electronic devices.

17. The flashing device according to claim 13, wherein the flashing device communicates with the managing device of a communications service provider to perform the flashing, and wherein the managing device includes one or more databases for flashing the electronic device utilizing the identifying information.

* * * * *